Jan. 14, 1964     W. G. GORMAN     3,117,700
AEROSOL VALVE HAVING A METERING GASKET
Filed March 29, 1961
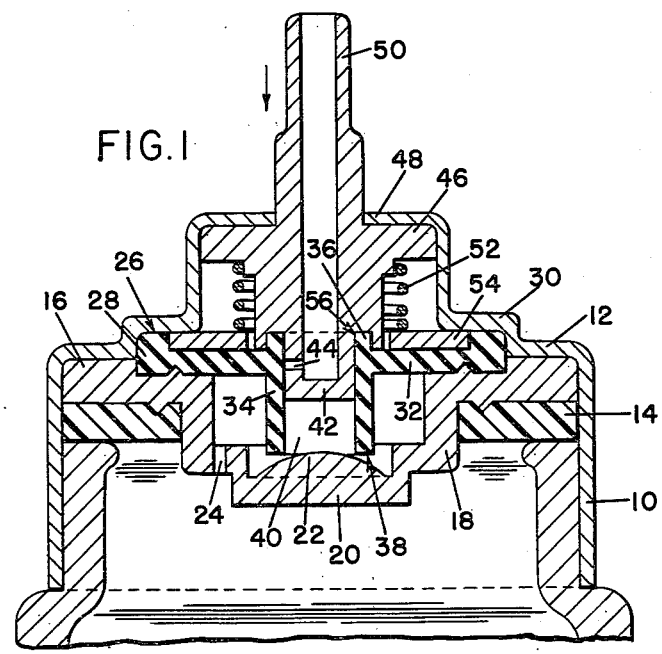
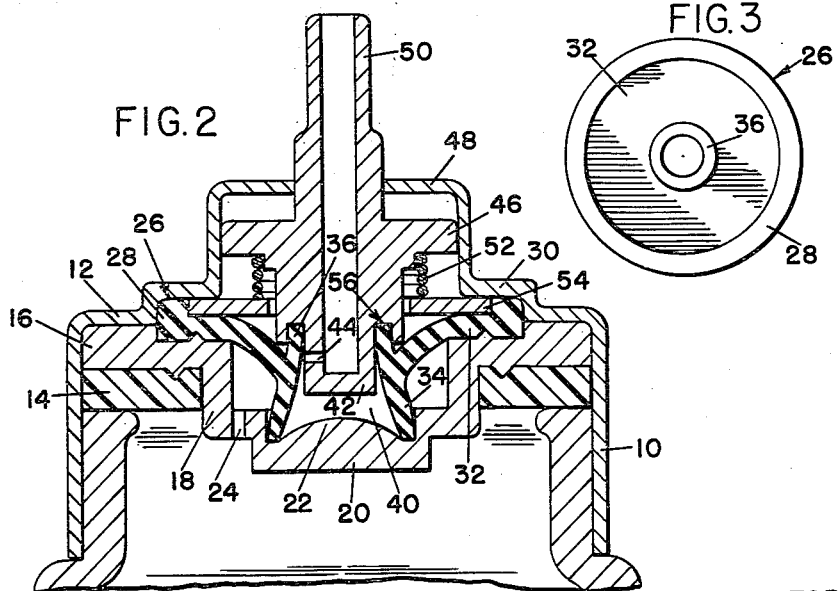
INVENTOR
WILLIAM G. GORMAN
ATTORNEY 3,117,700
AEROSOL VALVE HAVING A METERING GASKET
William G. Gorman, Albany, N.Y., assignor to Sterling
Drug Inc., New York, N.Y., a corporation of Delaware
Filed Mar. 29, 1961, Ser. No. 99,194
9 Claims. (Cl. 222—394)

This invention relates to a new and improved valve construction of the type used for metering aerosol container charges so that when the valve is actuated, a predetermined amount of material is discharged from the container.

There are many problems involved in the construction of devices of this nature, particularly with respect to sealing of the valve so that the pressure in the container will not cause leakage in the valve. The valve of the present invention comprises essentially a ferrule for attaching the valve to the mouth of the aerosol container, a body gasket positioned on the mouth of the container, a tank which is disposed essentially on the body gasket and is held in position by a ferrule, the ferrule having a construction which also mounts or guides the valve stem which is actuated to discharge the metered amount of material, and a novel sealing gasket which in this case is flexed by the valve stem and includes a metering chamber.

The principal object of the present invention resides in the provision of a device of the class described which will not leak and which has a unique construction and operation for metering a charge of material in the aerosol container to be dispensed; the objects of the invention also including the provision of a simplified construction with a relatively small number of parts providing a positively acting, substantially leakless, novel and inexpensive valve construction of the class described.

Further objects of the invention relate to a metered aerosol valve construction as described comprising essentially a tank member having an inlet port for communication with the interior of an aerosol container, a body gasket sealing off the tank at the edges thereof with respect to the container, a ferrule or the like holding the tank and other parts including the body gasket in position on the container; a flexible tank or metering gasket of novel configuration and action forming a metering chamber therein and a closure with respect to the exit port of the actuating valve stem, which operates to distort the sealing gasket causing both closure of the metering chamber relative to the container and opening of the exit port in the valve stem, there being an optional spring and washer member, if found to be desirable, for aiding in returning the valve stem to its original closed position after actuation.

The invention further relates to arrangements and combinations of parts which will be hereinafter described and more particularly set forth in the appended claims.

Reference is to be had to the accompanying drawings, in which

FIG. 1 is a sectional view illustrating the valve in closed condition;

FIG. 2 is a similar view showing the same open; and

FIG. 3 is a top plan view of the metering gasket.

In carrying out the present invention, the same is adapted to be mounted and secured to the mouth of a bottle or can usually provided for aerosols. There is a cylindrical ferrule 10 adapted to secure all of the parts to the aerosol container and this ferrule is provided with an inwardly directed flange 12 for this purpose. There is a body gasket 14 which is mounted directly on the lip of the container and is held in position by the tank and the flange 12 on the ferrule as will be clear from inspection of FIGS. 1 and 2.

The tank itself is circular and is provided with a rim or edge portion at 16 which underlies the flange 12 of the ferrule and overlies the body gasket 14. The tank extends inwardly and has a depending cylindrical portion 18 and a central portion at 20 which is upwardly domed as at 22 for a purpose to be described. There may be one or more inlet ports 24 for communication of the aerosol contents of the container into the interior of the tank above the domed portion 22 thereof.

The tank or metering gasket is generally indicated by the numeral 26 and it is provided with a relatively thickened rim 28 held in position by a stepped flange 30 which may be a part of the ferrule 10. This thickened portion 28 is circular in form and from this rim the tank or metering gasket extends inwardly as indicated at 32 terminating in an axially arranged central stem or cylindrical portion 34, the main part of which depends below the portion at 32 there being a small portion at 36 extending upwardly.

The lower edge portion 38 of the cylindrical portion 34 of the tank or metering gasket normally extends downwardly into close association but spaced from the domed portion 22 of the tank 20, and it will be seen therefore that there is direct communication between the interior of the aerosol container through inlet port 24 into the chamber inside the tank. The aerosol material enters the portion 34 of this gasket between the lower edge 38 of the cylindrical portion 34 and the domed portion 22 of the tank. The interior of the cylindrical portion 34 of the metering gasket which is indicated by the reference numeral 40 is a metering chamber, receiving the aerosol material when the valve is in closed position, FIG. 1.

This metering chamber is closed by the lower end portion 42 of the valve stem. This valve stem extends upwardly and is provided with an exit port 44. The valve stem has an enlarged portion 46 which fits under and is held in position by a terminal inwardly directed flange 48 of the ferrule. However, the stem extends upwardly centrally through flange 48 terminating in a stem portion 50 which is adapted to be depressed against the action of a spring 52 for a purpose to be described. If the spring 52 is present, it is preferably provided with a spring washer 54 against which the end of the spring may bear. The valve stem has a downwardly opening groove 56 receiving the upwardly extending rim 36 of the gasket 26.

The chamber 40 will of course be filled with the material which is to be dispensed, and to operate the device, stem 50 is depressed. The rim 36 of the metering gasket, finding a seat in the groove 56 and this connection causes the central portion of the metering gasket to be also depressed. This action causes the depending cylindrical portion 34 of the metering gasket to engage with the domed portion 22 of the tank at rim 38. This causes the gasket to become very tightly sealed with relation to the tank, and also to flare outwardly as clearly shown in FIG. 2. The port 44 then comes into communication with chamber 40 due to the distortion outwardly of the cylindrical portion 34 of the metering gasket, but no more material than was received in chamber 40 is allowed to escape due to the seal between the edge 38 of the cylindrical portion 34 of the metering gasket with respect to the domed part of the tank at 22.

The elasticity of the metering gasket returns the valve stem to closed position, once again sealing off exit port 44 and re-opening chamber 40 with respect to the tank and inlet port 24. In some cases it may be desired to increase or speed up this action by means of the spring 52 but this is not essential to a successful operation of the device.

Having thus described my invention and the advantages thereof, I do not wish to be limited to the details herein disclosed, otherwise than as set forth in the claims, but what I claim is:

1. A metering valve construction controlling the discharge of fluid material under pressure from an aerosol container, said valve construction comprising a tank member, means holding the tank member in position in the mouth of the aerosol container, said tank member having a chamber therein, means forming a continuously open passage from the aerosol container through a part of the tank into the tank chamber, said tank chamber being formed in part by a tank bottom member having an upwardly directed projection, a sealing and metering gasket, means holding the metering gasket in position with respect to said tank, said metering gasket having a centrally located, axially extended open portion, a valve stem having a portion thereof extending into said open portion of the metering gasket, a port in a portion of the valve stem that extends into said open portion of the metering gasket and being in engagement therewith and normally closed thereby, means on the valve stem engaging the metering gasket adjacent the surrounding upper edge of said open portion, said metering gasket being made of stretchable resilient material, said metering gasket being moved inwardly toward the projection on the bottom member of said tank upon motion of said valve stem in a predetermined direction, the bottom edge of said open portion of said metering gasket being thereby caused to impinge upon the projection forming a seal therewith, said open portion at the same time being distorted thereby to open the port in the valve stem for emission through the valve stem of the fluid contents of the chamber formed by the said open portion with its bottom edge in sealing relation with said projection.

2. The metering valve of claim 1 wherein said metering gasket is substantially self-sustaining under normal conditions and due to its own resilience causes return of the valve stem and closure of the port upon release of the valve stem.

3. The metering valve of claim 1 including spring means for returning said valve stem to its original position.

4. The metering valve of claim 1 wherein the open portion of the metering gasket is in the form of a cylinder with said bottom edge depending into close but normal spaced relation with respect to the projection.

5. A metering valve construction for aerosol containers including means to hold the valve construction to the mouth of the container, said valve construction comprising a tank, means for holding the tank in the mouth of its container, means forming communication between the interior of the aerosol container and the interior of the tank, an actuating valve stem, and a resilient, distortable sealing metering gasket, means on said gasket for engagement by the inner end of said valve stem for distortion of the gasket by a predetermined motion of the valve stem, said metering gasket having a generally central portion in the form of a cylinder extending in a direction toward but normally spaced from a portion of the tank, a port in the inner portion of the valve stem which is in engagement with said cylindrical portion, said port being normally closed thereby, and means on the tank for distorting said cylindrical portion of said metering gasket exposing the port to the interior of said cylindrical portion, the latter also forming a sealed closure with the said portion of the tank by impingement of the end of the cylindrical portion of said metering gasket upon the said tank portion upon said predetermined motion of the valve stem.

6. The metering valve construction of claim 5 wherein the said tank portion is provided with an upwardly protruding surface against which the inner end of the cylindrical portion of the metering gasket is adapted to impinge upon inward actuation of the valve stem.

7. The metering valve construction of claim 5 wherein the said tank portion is provided with an upwardly protruding surface against which the inner end of the cylindrical portion of the metering gasket is adapted to impinge upon inward actuation of the valve stem, said protruding surface spreading and stretching the material of the cylindrical portion of the metering valve.

8. A metering valve construction for controlling the discharge of fluid material under pressure from an aerosol container, said valve construction comprising a tank, means holding the tank at the mouth of the aerosol container, said tank including means forming a chamber separate from the aerosol container, a passage in the tank for communication between the aerosol container and the chamber in the tank, a metering gasket, means mounting the metering gasket in conjunction with said tank, said metering gasket including a generally central hollow depending portion forming a metering chamber, said central hollow depending portion normally stopping short of an adjacent portion of the tank so as to provide communication between the metering chamber and said passage, a valve stem, said valve stem having a portion thereof located in said depending hollow portion of the metering gasket, a port in a side wall of said valve stem, said valve stem being hollow, said port normally being closed by said depending portion of said metering gasket but being opened and forming communication with said metering chamber upon motion of the valve stem in a direction inwardly to cause impingement of the inner end of the depending portion of the metering gasket against the said portion of the tank, thus causing deformation of the depending gasket portion and closing the metering chamber with respect to the tank and opening the port in the valve stem to the metering chamber.

9. The metering valve construction as recited in claim 8 wherein the said adjacent portion of the tank is a bottom wall thereof, the latter being rounded so that it causes flaring and outward distortion of the depending hollow portion of the metering gasket.

References Cited in the file of this patent
UNITED STATES PATENTS

| | | |
|---|---|---|
| 2,746,796 | St. Germain | May 22, 1956 |
| 2,802,490 | Ward | Aug. 13, 1957 |
| 2,900,114 | Utz | Aug. 18, 1959 |
| 2,933,222 | Waldherr | Apr. 19, 1960 |